(12) United States Patent
Yamashita et al.

(10) Patent No.: US 11,067,849 B2
(45) Date of Patent: Jul. 20, 2021

(54) LIQUID CRYSTAL DISPLAY APPARATUS

(71) Applicant: PANASONIC INTELLECTUAL PROPERTY MANAGEMENT CO., LTD., Osaka (JP)

(72) Inventors: Shuji Yamashita, Nara (JP); Hisanori Sasaki, Osaka (JP); Satoru Shibata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/080,053

(22) Filed: Oct. 26, 2020

(65) Prior Publication Data

US 2021/0055605 A1 Feb. 25, 2021

Related U.S. Application Data

(63) Continuation of application No. PCT/JP2019/012242, filed on Mar. 22, 2019.

(30) Foreign Application Priority Data

Apr. 27, 2018 (JP) .............................. JP2018-086775

(51) Int. Cl.
  *G02F 1/1335* (2006.01)
  *F21V 8/00* (2006.01)
  *G02F 1/1333* (2006.01)

(52) U.S. Cl.
  CPC ..... *G02F 1/133553* (2013.01); *G02B 6/0091* (2013.01); *G02F 1/133308* (2013.01); *G02F 1/133314* (2021.01); *G02F 2202/28* (2013.01)

(58) Field of Classification Search
  None
  See application file for complete search history.

(56) References Cited

U.S. PATENT DOCUMENTS

2003/0030765 A1 2/2003 Hayashi et al.
2008/0303979 A1 12/2008 Shimizu
(Continued)

FOREIGN PATENT DOCUMENTS

EP 1 306 714 A1 5/2003
JP 2002-122861 A 4/2002
(Continued)

OTHER PUBLICATIONS

International Search Report issued in International Patent Application No. PCT/JP2019/012242, dated Jun. 4, 2019; with English translation.

*Primary Examiner* — Phu Vu
(74) *Attorney, Agent, or Firm* — McDermott Will and Emery LLP

(57) ABSTRACT

A liquid crystal display apparatus includes a quadrangular liquid crystal panel, a light guiding plate formed in a quadrangular shape substantially the same as that of the liquid crystal panel and having a pair of convex portions that protrude outward from a pair of end surfaces, and a frame having a light source holding plate in which a light source is mounted on a light source fixing plate, the light source fixing plate facing the one end surface, the back-side portion being formed in a quadrangular shape substantially the same as that of the liquid crystal panel. Bent side plate portions, which face the pair of end surfaces, are respectively provided on a pair of side portions of the back-side portion. Notches, into which the convex portions are fitted, are provided in the pair of bent side plate portions.

7 Claims, 14 Drawing Sheets

(56) References Cited

U.S. PATENT DOCUMENTS

| | | |
|---|---|---|
| 2014/0267971 A1 | 9/2014 | Sugimoto et al. |
| 2016/0187715 A1* | 6/2016 | Choi .................... G02F 1/1336 349/63 |
| 2017/0199423 A1* | 7/2017 | Cheng ............... G02F 1/133553 |

FOREIGN PATENT DOCUMENTS

| | | |
|---|---|---|
| JP | 2002-162912 A | 6/2002 |
| JP | 2002-258281 A | 9/2002 |
| JP | 2003-114417 A | 4/2003 |
| JP | 3901503 B2 | 4/2007 |
| JP | 2008-305576 A | 12/2008 |
| JP | 2014-174540 A | 9/2014 |
| WO | 02/01854 A2 | 1/2002 |
| WO | 02/10854 A1 | 2/2002 |

* cited by examiner ns
LIQUID CRYSTAL DISPLAY APPARATUS

CROSS-REFERENCE OF RELATED APPLICATIONS

This application is a Continuation of International Patent Application No. PCT/JP2019/012242, filed on Mar. 22, 2019, which in turn claims the benefit of Japanese Application No. 2018-086775, filed on Apr. 27, 2018, the entire disclosures of which Applications are incorporated by reference herein.

BACKGROUND OF THE INVENTION

1. Field of the Invention

The present disclosure relates to a liquid crystal display apparatus.

2. Description of the Related Art

JP-A-2003-114417 discloses a liquid crystal display apparatus including a liquid crystal panel that includes a planar surface, a plate-shaped front light, and a frame-shaped protector that is provided at a peripheral edge portion of the front light and mounts the front light on a surface of the liquid crystal panel. The protector includes a rear case that supports the front light from a back surface, a front case that is provided on a surface side of the liquid crystal panel, and a protective film that covers the peripheral edge portion of the front light from the surface side and is adhered onto the rear case.

SUMMARY OF THE INVENTION

The present disclosure has been devised in view of the related-art circumstances described above, and an object thereof is to provide a liquid crystal display apparatus that achieves edge narrowing with simple components and prevents positional deviation between a light source and a light guiding plate for a front light.

The present disclosure provides a liquid crystal display apparatus including: a quadrangular liquid crystal panel having a reflection layer on a back surface opposite to a display surface of the liquid crystal panel; a light guiding plate formed in a quadrangular shape substantially the same as that of the liquid crystal panel, being laminated on the display surface, configured to diffusely reflect light incident from one end surface of the light guiding plate and emits the light toward the display surface, and having a pair of convex portions that protrude outward from a pair of end surfaces that sandwich the one end surface; and a frame having a light source holding plate in which a light source is mounted on a light source fixing plate, the light source causing light to be incident on the one end surface, the light source fixing plate being bent perpendicularly to a back-side portion and facing the one end surface, the back-side portion being formed in a quadrangular shape substantially the same as that of the liquid crystal panel, in which bent side plate portions that face the pair of end surfaces are respectively provided on a pair of side portions of the back-side portion that sandwich the light source fixing plate, and in which notches, into which the convex portions are fitted, are provided in the pair of bent side plate portions.

According to the present disclosure, in the liquid crystal display apparatus, the positional deviation between the light source and the light guiding plate for the front light can be prevented while achieving the edge narrowing with the simple components.

DETAILED DESCRIPTION OF THE EXEMPLARY EMBODIMENTS

Background to Contents of First Embodiment

In the related art, a reflective liquid crystal display apparatus is known in which a front light is provided as an auxiliary light source on a surface side of a reflective liquid crystal panel. In the liquid crystal display apparatus of Patent Literature 1, since many frame-shaped members such as a front case, a rear case, and a cell case are used in order to laminate the front light and the liquid crystal panel, the structure is complicated. Further, since a frame-shaped protector is further housed in the frame-shaped cell case, a width of a frame that surrounds a periphery of the liquid crystal panel tends to increase. On the other hand, since the front light is a thin surface material, when fixing strength decreases with the frame-shaped member as a narrow edge, there is a concern that positional deviation with a light source may occur due to thermal expansion.

Hereinafter, a liquid crystal display apparatus that achieves edge narrowing with simple components and prevents positional deviation between a light source and a light guiding plate for a front light will be described.

Hereinafter, an embodiment specifically disclosing a liquid crystal display apparatus according to the present disclosure will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy in the following description and to facilitate understanding of those skilled in the art. It is to be understood that the accompanying drawings and the following description are provided to enable those skilled in the art to fully understand the present disclosure, and are not intended to limit the range of the claims.

First Embodiment

Figure 1:
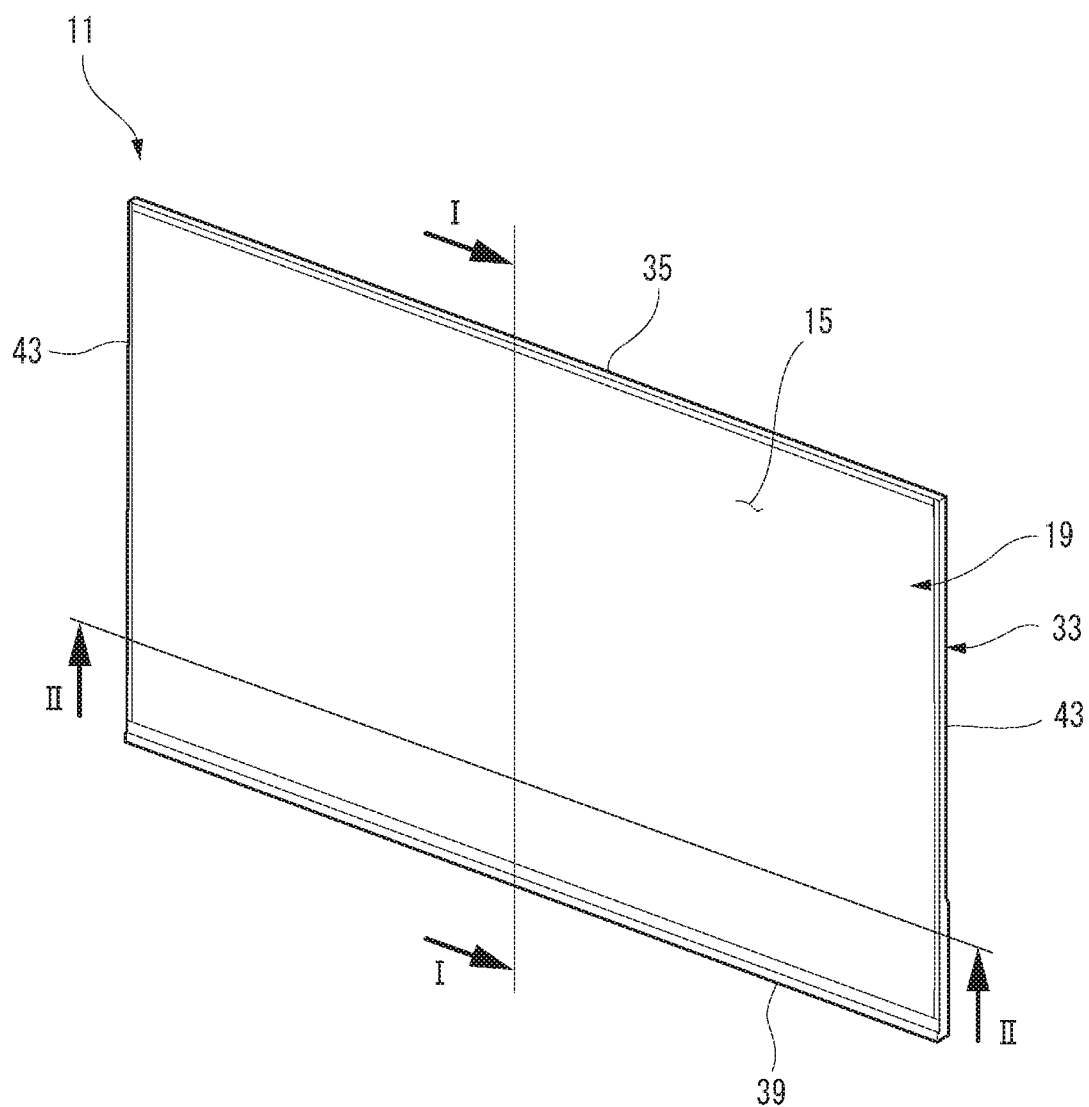
FIG. 1 is a perspective view of an external appearance of a liquid crystal display apparatus according to a first embodiment.

FIG. 1 is a perspective view of an external appearance of a liquid crystal display apparatus 11 according to a first embodiment. The liquid crystal display apparatus 11 according to the first embodiment includes a liquid crystal panel 13, a light guiding plate 15, and a frame 17 as main components.

In the liquid crystal display apparatus 11, a front light 19 is provided on a surface side of the reflective liquid crystal panel 13 as an auxiliary light source. The front light 19 is configured by the light guiding plate 15 and LEDs 21 that is a light source. The liquid crystal panel 13 does not emit light by itself, changes a transmission intensity of light so as to perform display and can be driven with an effective voltage of, for example, several volts. The reflective liquid crystal panel 13 includes a reflection layer 23 on a lower side and performs display using reflected light from the reflection layer 23 of external light. Therefore, power consumption is extremely low. In the liquid crystal display apparatus 11, the reflective liquid crystal panel 13 includes the front light 19. Accordingly, high visibility under sunlight and visibility at night are made possible. Then, as compared with a transmissive liquid crystal panel including a backlight used in a related-art mobile phone or the like, a cooling fan can also be eliminated. Therefore, the power consumption can be significantly reduced.

In the first embodiment, the light source is not limited to the LED 21 and may be, for example, a cold cathode fluorescence lamp called a CCFL.

Figure 2:
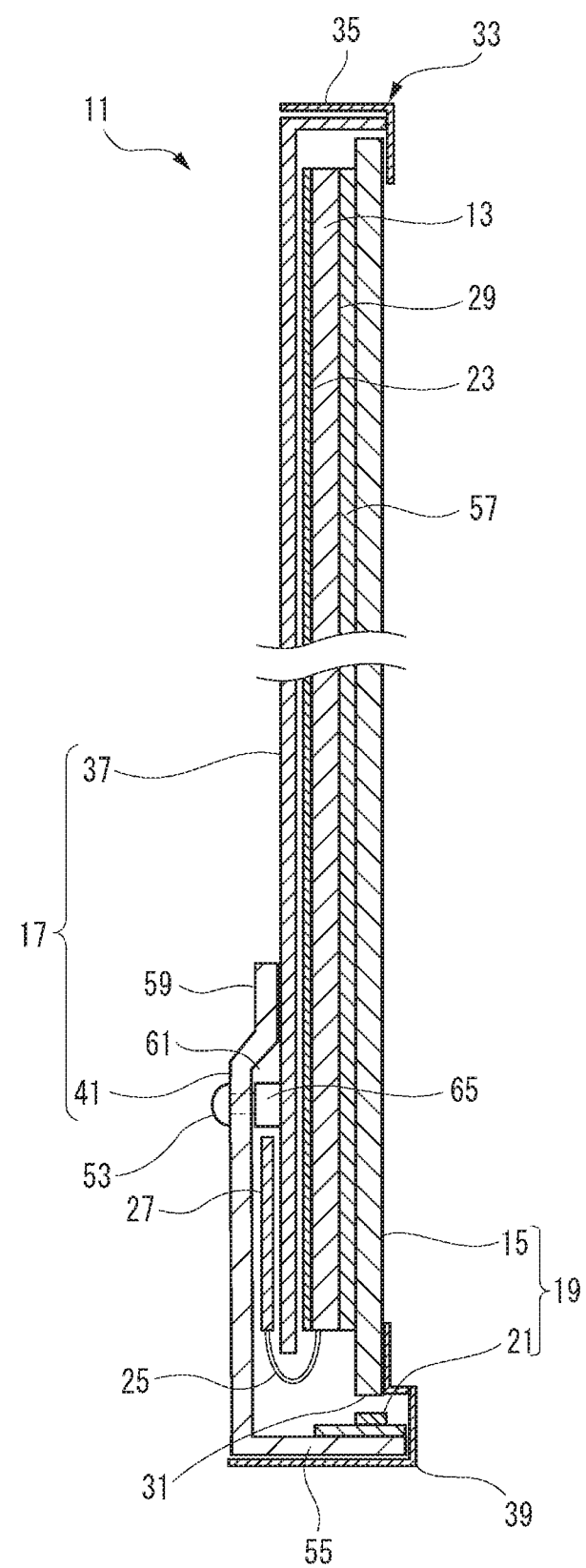
FIG. 2 is a cross-sectional view taken along a line I-I in FIG. 1.

FIG. 2 is a cross-sectional view taken along a line I-I in FIG. 1. The liquid crystal panel 13 is configured by sandwiching a liquid crystal between a quadrangular upper glass on which a segment electrode group is formed and a quadrangular lower glass on which a common electrode group is formed. The liquid crystal is sealed in a gap between the upper glass and the lower glass and an outer periphery thereof is sealed. The segment electrode group and the common electrode group are connected to one end of, for example, an FFC 25 (flexible flat cable) or an FPC (flexible printed wiring board) in which a conductor is pattern-printed on a flexible insulation substrate. The other end of the FFC 25 or the like is connected, by a relay substrate 27, to a driver or the like that drives the liquid crystal.

In the first embodiment, the liquid crystal panel 13 is formed to have a size of, for example, 32 inches. The size of the liquid crystal panel 13 is not limited thereto.

The relay substrate 27 supplies an electrical signal or electrical energy that drives the liquid crystal panel 13. The liquid crystal panel 13 displays a desired image on a display surface 29 by the electrical signal or the electrical energy supplied from the relay substrate 27.

The liquid crystal display apparatus 11 includes the reflection layer 23 disposed on a back surface opposite to the display surface 29. The reflection layer 23 may be provided as a reflection plate on the lower glass, or may be attached as a reflection sheet to the lower glass. The reflection layer 23 reflects external light transmitted through the light guiding plate 15 and the liquid crystal panel 13 toward the liquid crystal panel 13. Further, the reflection layer 23 reflects light emitted from the light guiding plate 15 and transmitted through the liquid crystal panel 13 toward the liquid crystal panel 13.

The light guiding plate 15 is formed in a quadrangle substantially the same as that of the liquid crystal panel 13. The shapes of the liquid crystal panel 13 and the light guiding plate 15 may not be formed in a quadrangular shape as long as a condition is satisfied under which the liquid crystal panel 13 and the light guiding plate 15 are positioned by the light guiding plate 15 and a back-side frame 37 in the vicinity of end portion sides of one side along one end surface 31. In the first embodiment, the light guiding plate 15 is formed of a transparent plate material made of acrylic resin. The light guiding plate 15 is not limited to the acrylic resin, and may be, for example, glass.

The light guiding plate 15 is laminated on the display surface 29 of the liquid crystal panel 13. The light guiding plate 15 diffusely reflects light incident from the one end surface 31 and emits the light toward the display surface 29 of the liquid crystal panel 13. The light guiding plate 15 has, for example, a prism processing performed on a surface side and an anti-reflection material applied on a back surface side. The light incident from the one end surface 31 of the light guiding plate 15 propagates through the light guiding plate 15 as a medium, and a part thereof is reflected by a prism-processed portion on the surface side and emitted as diffused light toward a liquid crystal panel side. Accordingly, the light guiding plate 15 has a function of reflecting light from the LEDs 21 and causing the light to be incident on the liquid crystal panel 13, a function of transmitting light reflected by the reflection layer 23 to an outside, and a function of transmitting light from the outside to the liquid crystal panel 13.

The light guiding plate 15 is adhered to the display surface 29 of the liquid crystal panel 13 by an adhesive layer 57 to be described later. A peripheral edge of the light guiding plate 15 integrated with the liquid crystal panel 13 is held on the frame 17 by a frame member 33 (so-called bezel). The frame member 33 is fixed (screwed) to the frame 17 by a screw that is a fastener. A bezel upper side 35 is screwed to the back-side frame 37 that constitutes the frame 17. A bezel lower side 39 is screwed to an LED holding plate 41 that constitutes the frame 17.

Figure 3:
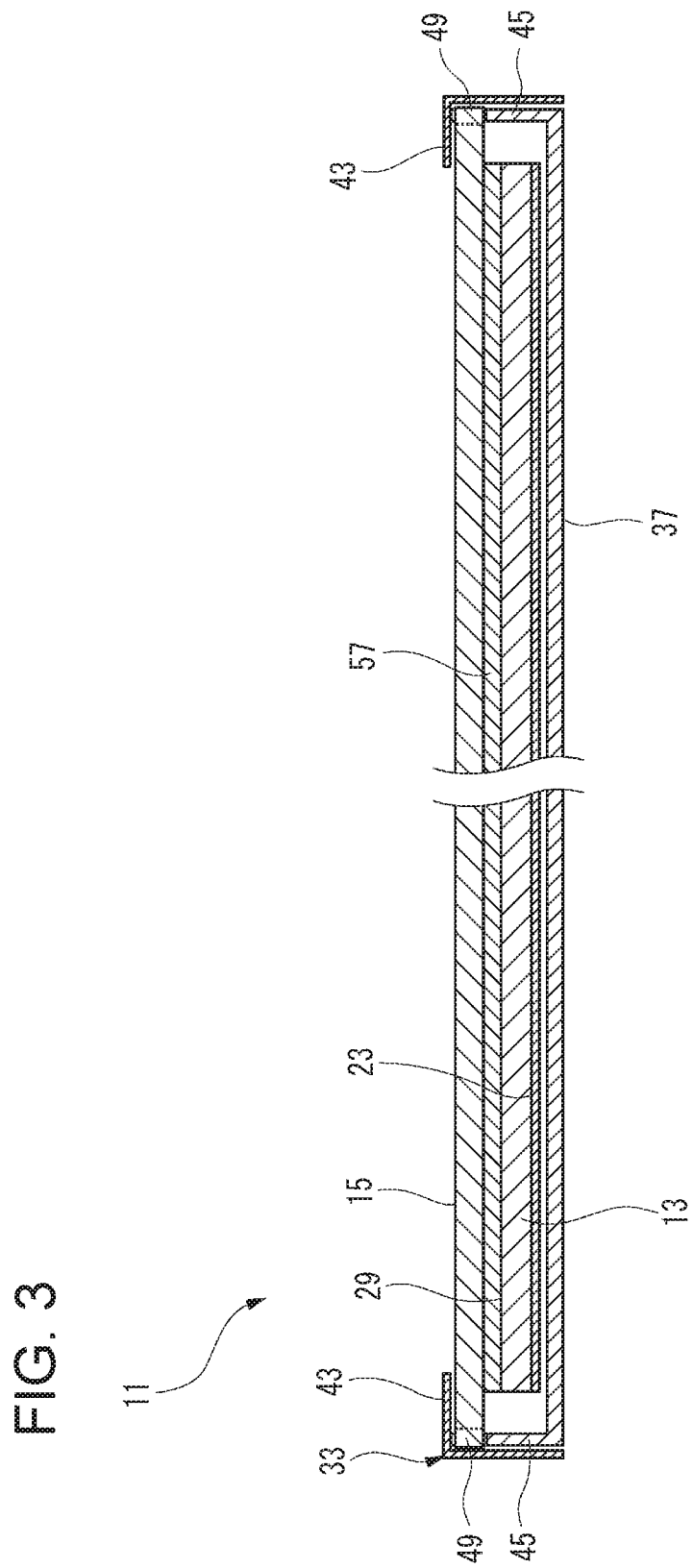
FIG. 3 is a cross-sectional view taken along a line II-II in FIG. 1.

FIG. 3 is a cross-sectional view taken along a line II-II in FIG. 1. Bezel lateral sides 43 are respectively screwed to bent side plate portions 45 of the back-side frame 37.

The light guiding plate 15 includes a pair of convex portions 49 (see FIG. 8 for details) that protrude outward from a pair of parallel adjacent end surfaces 47 (see FIG. 7 for an example of the end surfaces) that sandwich the one end surface 31. As will be described later, one of the pair of convex portion 49 is fitted into a notch 51 provided in the back-side frame 37.

Figure 4:
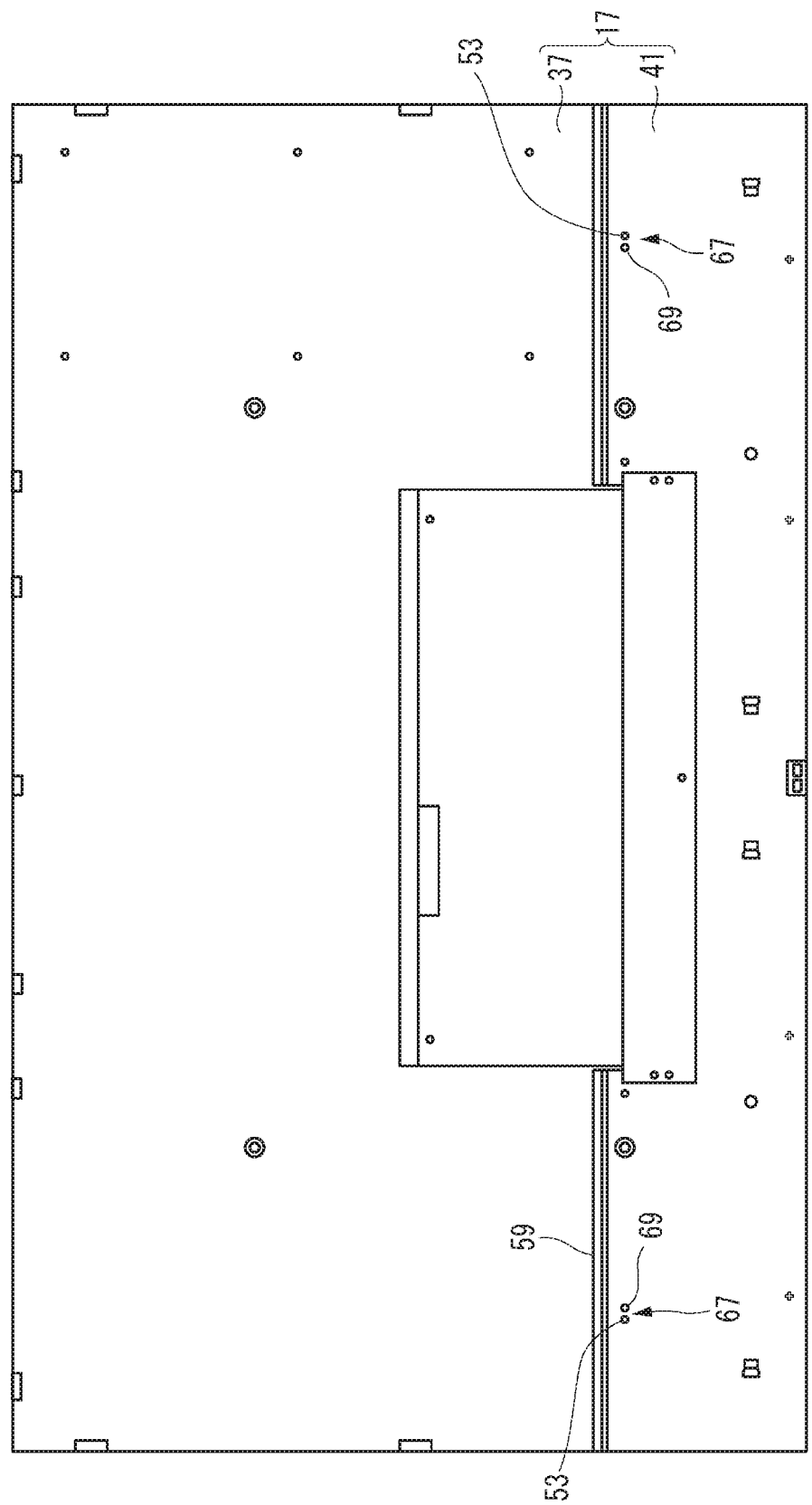
FIG. 4 is a rear view of the liquid crystal display apparatus shown in FIG. 1.

FIG. 4 is a rear view of the liquid crystal display apparatus 11 shown in FIG. 1. In the first embodiment, in the frame 17, the back-side frame 37 and the LED holding plate 41 that are separately formed are integrally fixed by screws 53 as fasteners. The back-side frame 37 is formed in a quadrangular shape substantially the same as that of the liquid crystal panel 13. The LED holding plate 41 is formed in a long shape that extends along the one end surface 31.

In the frame 17, the back-side frame 37 and the LED holding plate 41 may be integrally formed by a single metal plate.

Figure 5:
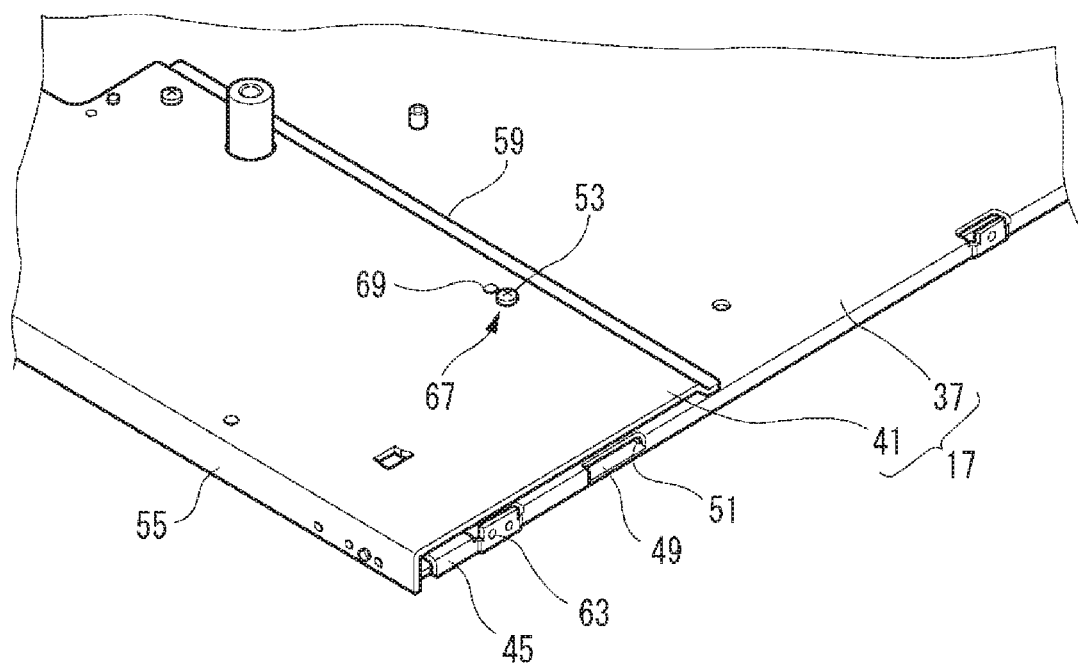
FIG. 5 is a perspective view of one end portion of an LED holding plate shown in FIG. 4 in an extending direction.

FIG. 5 is a perspective view of one end portion in the extending direction of the LED holding plate 41 shown in FIG. 4. The LED holding plate 41 includes an LED fixing plate 55 that is bent perpendicularly to the back-side frame 37 and faces the one end surface 31 of the light guiding plate 15. In other words, the LED holding plate 41 and the LED fixing plate 55 are formed by bending one plate material perpendicularly to the back-side frame 37, so that a plate material portion parallel to the back-side frame 37 and a plate material portion perpendicular to the back-side frame 37 (that is, the LED fixing plate 55) are formed. On the LED fixing plate 55 of the LED holding plate 41, a plurality of LEDs 21 that cause light to be incident on the one end surface 31 of the light guiding plate 15 are linearly arranged at equal intervals (see FIG. 2).

Figure 6:
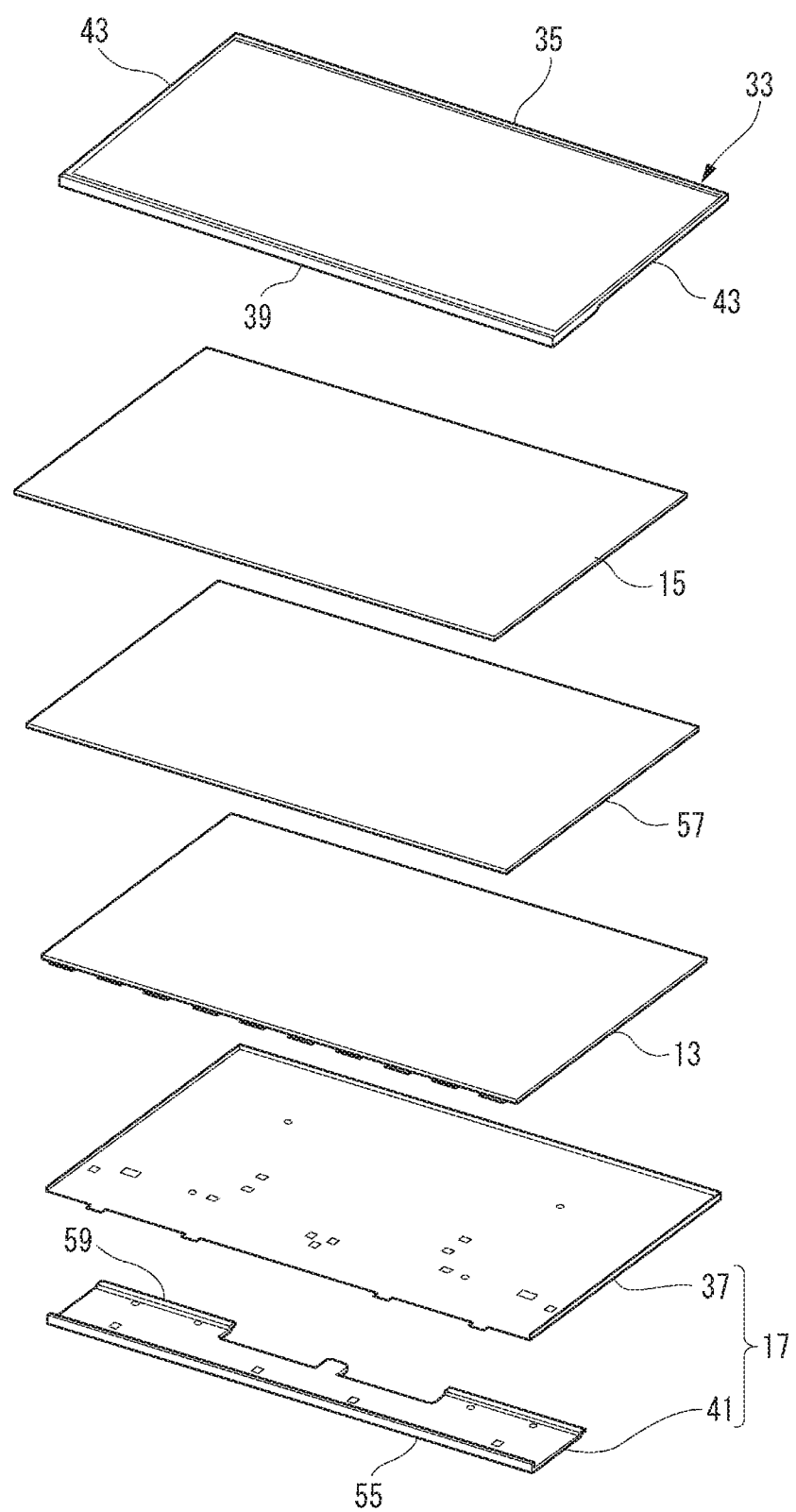
FIG. 6 is an exploded perspective view of members laminated between a light guiding plate and the LED holding plate.

FIG. 6 is an exploded perspective view of members laminated between the light guiding plate 15 and the LED holding plate 41. In the liquid crystal display apparatus 11, the light guiding plate 15 is closely fixed to the display surface 29 of the liquid crystal panel 13 via the adhesive layer 57. In the liquid crystal display apparatus 11, the back-side frame 37, the liquid crystal panel 13, the adhesive layer 57, and the light guiding plate 15 are sequentially laminated from a lower layer side of the liquid crystal display apparatus 11. Among them, the liquid crystal panel 13 and the light guiding plate 15 are integrally assembled by the adhesive layer 57. The light guiding plate 15 to which the liquid crystal panel 13 is integrally fixed is positioned on the back-side frame 37. The frame member 33 is screwed to the back-side frame 37 and the LED holding plate 41, so that the light guiding plate 15 positioned on the back-side frame 37 is held by the frame member 33 and the frame 17.

In the first embodiment, the liquid crystal display apparatus 11 is assembled with the back-side frame 37 and the liquid crystal panel 13 not being fixed.

In the liquid crystal display apparatus 11, the LED holding plate 41 is formed of a metal plate thicker than a plate thickness of the back-side frame 37.

In the liquid crystal display apparatus 11, a Z-bent portion 59 (see FIG. 2) is formed on aside opposite to the LED fixing plate 55 of the LED holding plate 41. The LED holding plate 41 has a component housing space 61 formed between the back-side frame 37 and the LED holding plate 41 (see FIG. 2) by abutting a tip end of the Z-bent portion 59 against the back-side frame 37.

Figure 7:
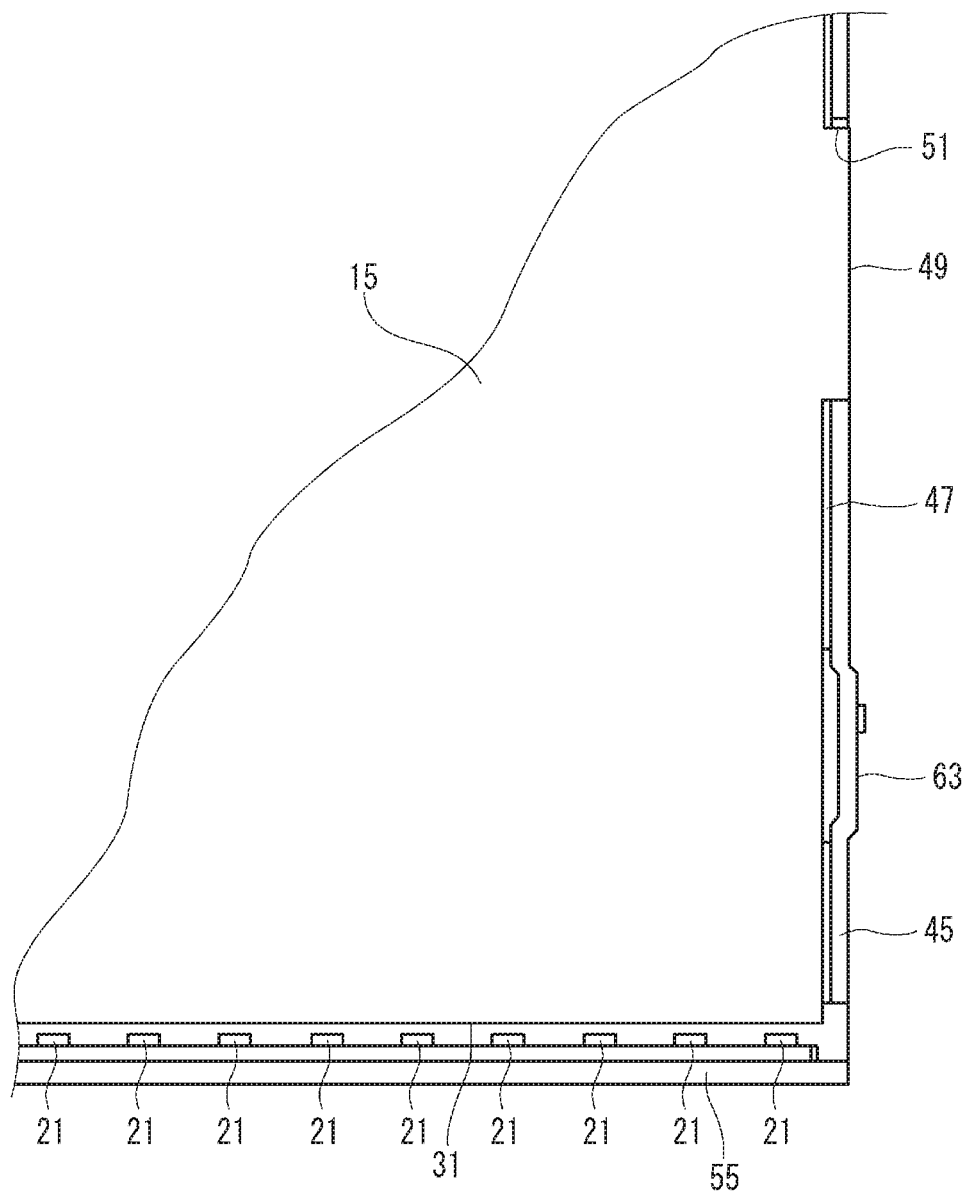
FIG. 7 is a plan view of a fitting structure including a convex portion and a notch.

FIG. 7 is a plan view of a fitting structure including a convex portion 49 and a notch 51. In the light guiding plate 15 integrated with the liquid crystal panel 13, the convex portions 49 that protrude from both sides along the extending direction of the one end surface 31 are fitted into the notches 51 of the back-side frame 37. With this fitting structure, movement of the light guiding plate 15 in a surface direction is restricted, and the light guiding plate 15 is positioned on the back-side frame 37. The liquid crystal panel 13 adhered to and integrated with the light guiding plate 15 is also similarly positioned on the back-side frame 37 via the light guiding plate 15.

Figure 8:
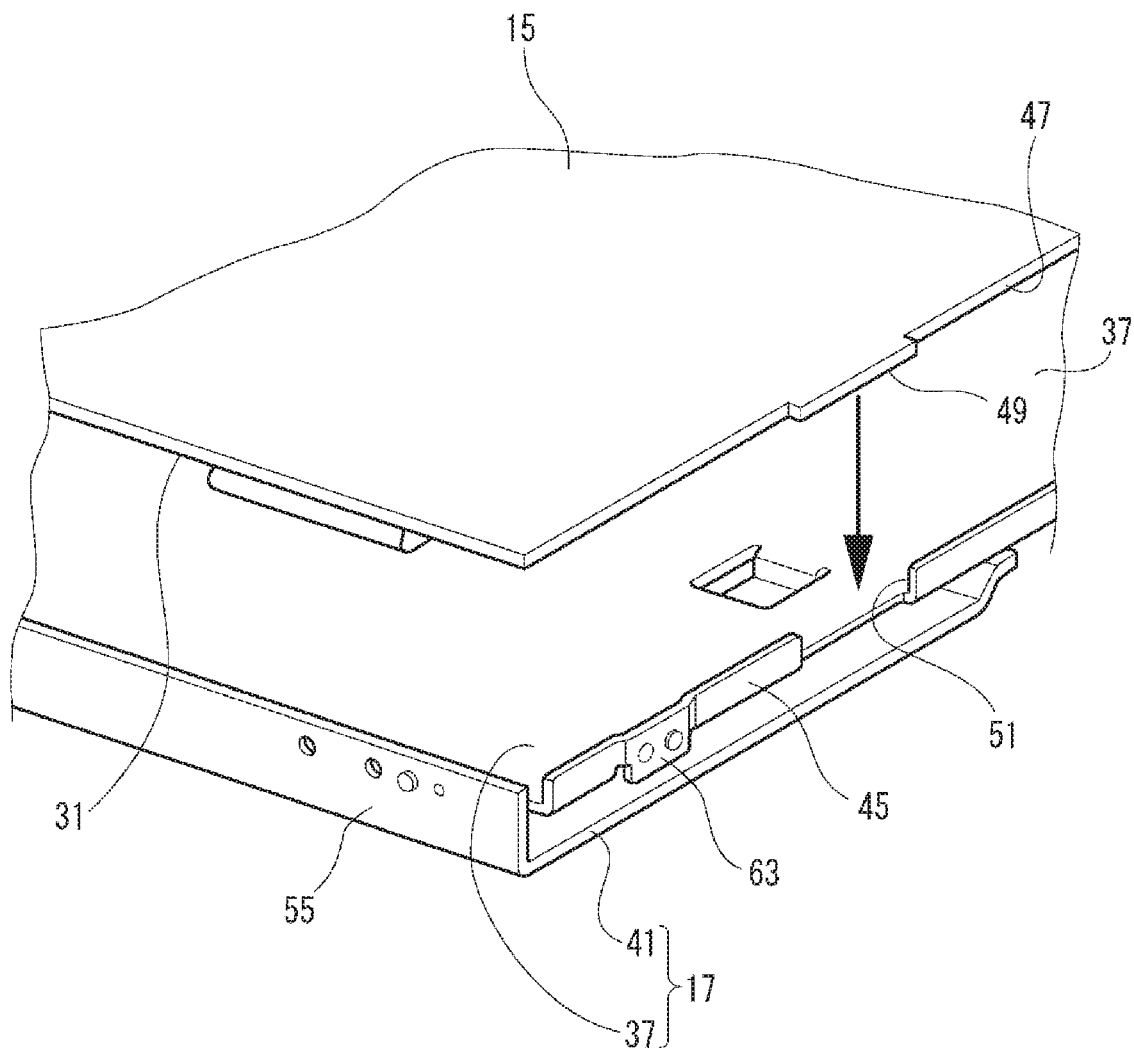
FIG. 8 is an exploded perspective view of the fitting structure including the convex portion and the notch.

FIG. 8 is an exploded perspective view of the fitting structure including the convex portion 49 and the notch 51. In the back-side frame 37, the bent side plate portions 45 that face a pair of adjacent end surfaces 47 of the light guiding plate 15 are formed on a pair of adjacent side portions that sandwich the LED fixing plate 55, respectively. Then, the pair of bent side plate portions 45 are provided with the notches 51 into which the convex portions 49 of the light guiding plate 15 are fitted. The convex portions 49 of the light guiding plate 15 are formed in the vicinity of the one end surface 31 on the pair of parallel adjacent end surfaces 47 that sandwich the one end surface 31. Therefore, the notches 51 into which the convex portions 49 are fitted are also formed in the vicinity of the one end surface 31 in the pair of bent side plate portions 45. Each of the convex portions 49 is formed with a protrusion length of, for example, about 2 mm. A frame-member-fixing bulging portion 63 for fixing the frame member 33 is formed on a bent side plate portion 45 on a light source fixing plate side of the LED holding plate 41 with respect to a notch 51.

Figure 9:
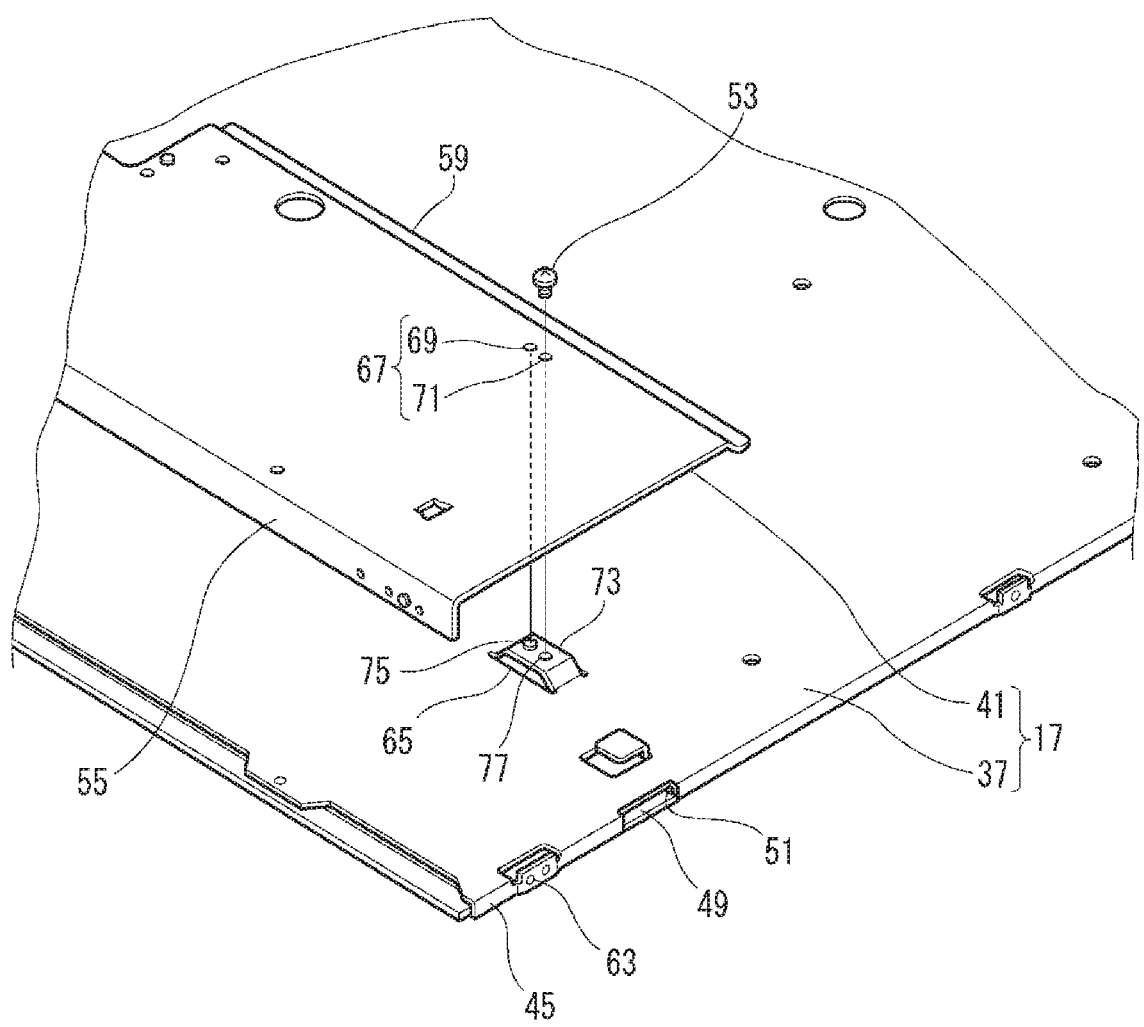
FIG. 9 is an exploded perspective view of a positioning portion between a bulging portion and the LED holding plate.

FIG. 9 is an exploded perspective view of a positioning portion 67 between a bulging portion 65 and the LED holding plate 41. A pair of positioning portions 67 each including a positioning hole 69 and a fastener insertion hole 71 are formed in the LED holding plate 41. The pair of positioning portions 67 are provided separately in a direction along the one end surface 31.

On the other hand, a pair of bulging portions 65 that protrude toward the LED holding plate 41 are formed on the back-side frame 37. The bulging portions 65 are also provided separately in the direction along the one end surface 31. Each of the bulging portions 65 includes a boss 75 fitted into a positioning hole 69 of the back-side frame 37 and a female screw portion 77 with which a screw 53 is screwed, on a tip end seating surface 73 that is a flat surface.

Next, a positional relationship between the LEDs 21 and the light guiding plate 15 will be described using specific numerical values as an example.

Figure 10:
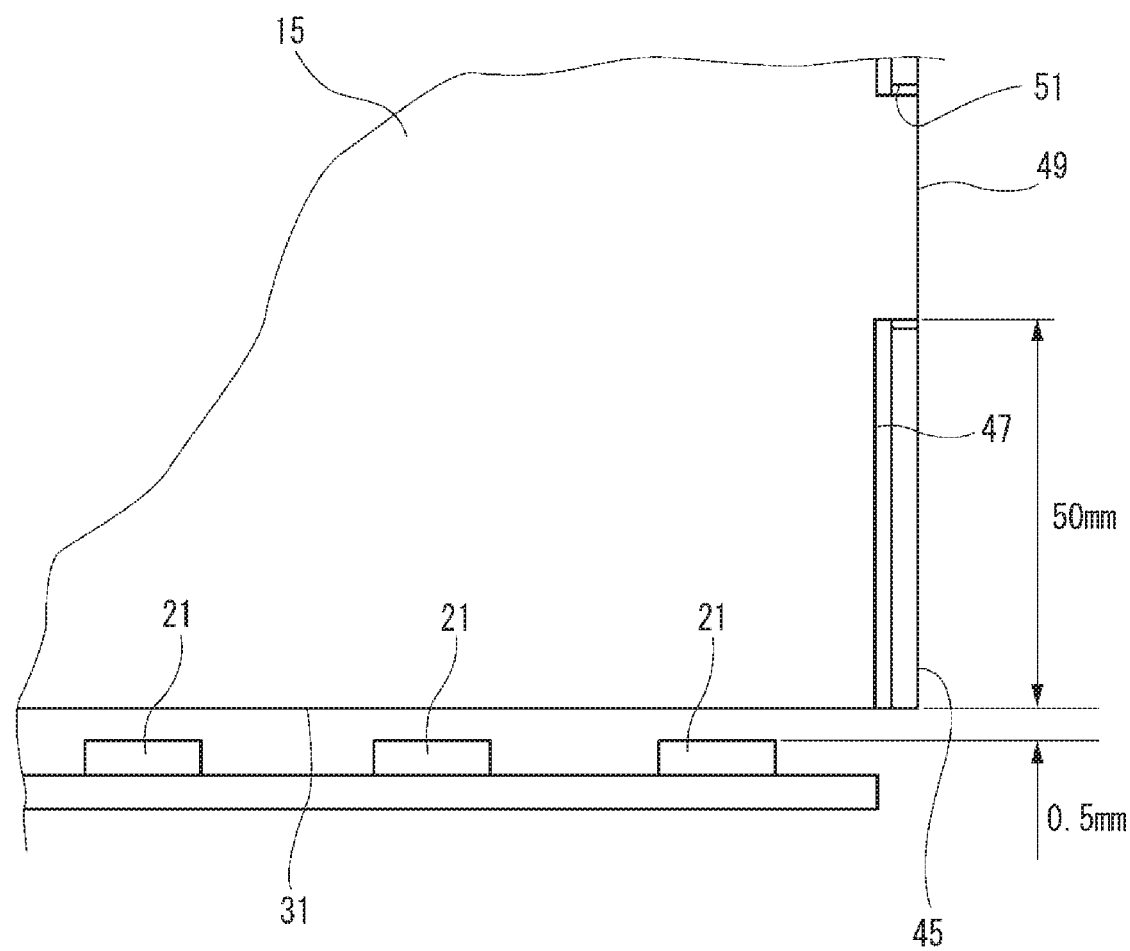
FIG. 10 is an enlarged plan view of main parts showing an example of positioning dimensions of LEDs and the light guiding plate.

FIG. 10 is an enlarged plan view of main parts showing an example of positioning dimensions of the LEDs 21 and the light guiding plate 15. In a positioning structure of the light guiding plate 15 and the LEDs 21, a gap between the one end surface 31 of the light guiding plate 15 and a light emitting surface of the LEDs 21 can be set to, for example, about 0.5 mm. In this case, a distance from the one end surface 31 to a convex portion 49 is set in the vicinity of, for example, about 50 mm.

Figure 11:
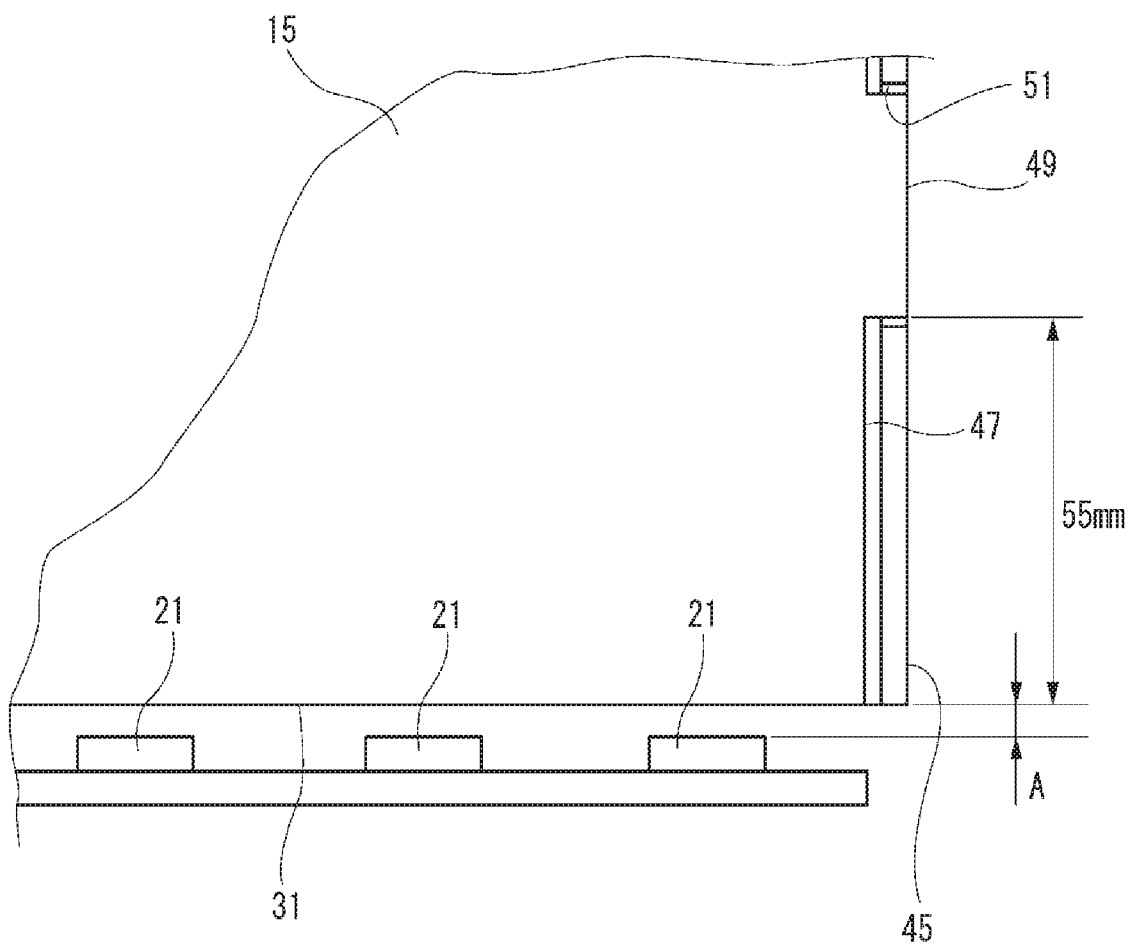
FIG. 11 is an operation illustrative view when a convex portion is relatively close to one end surface.

FIG. 11 is an operation illustrative view when the convex portion 49 is relatively close to the one end surface 31. Here, if the distance from the one end surface 31 to the convex portion 49 is 55 mm, a gap A when a temperature changes from 20° C. to 60° C. at a room temperature is 0.4 mm (an amount of change: 0.1 mm).

Figure 12:
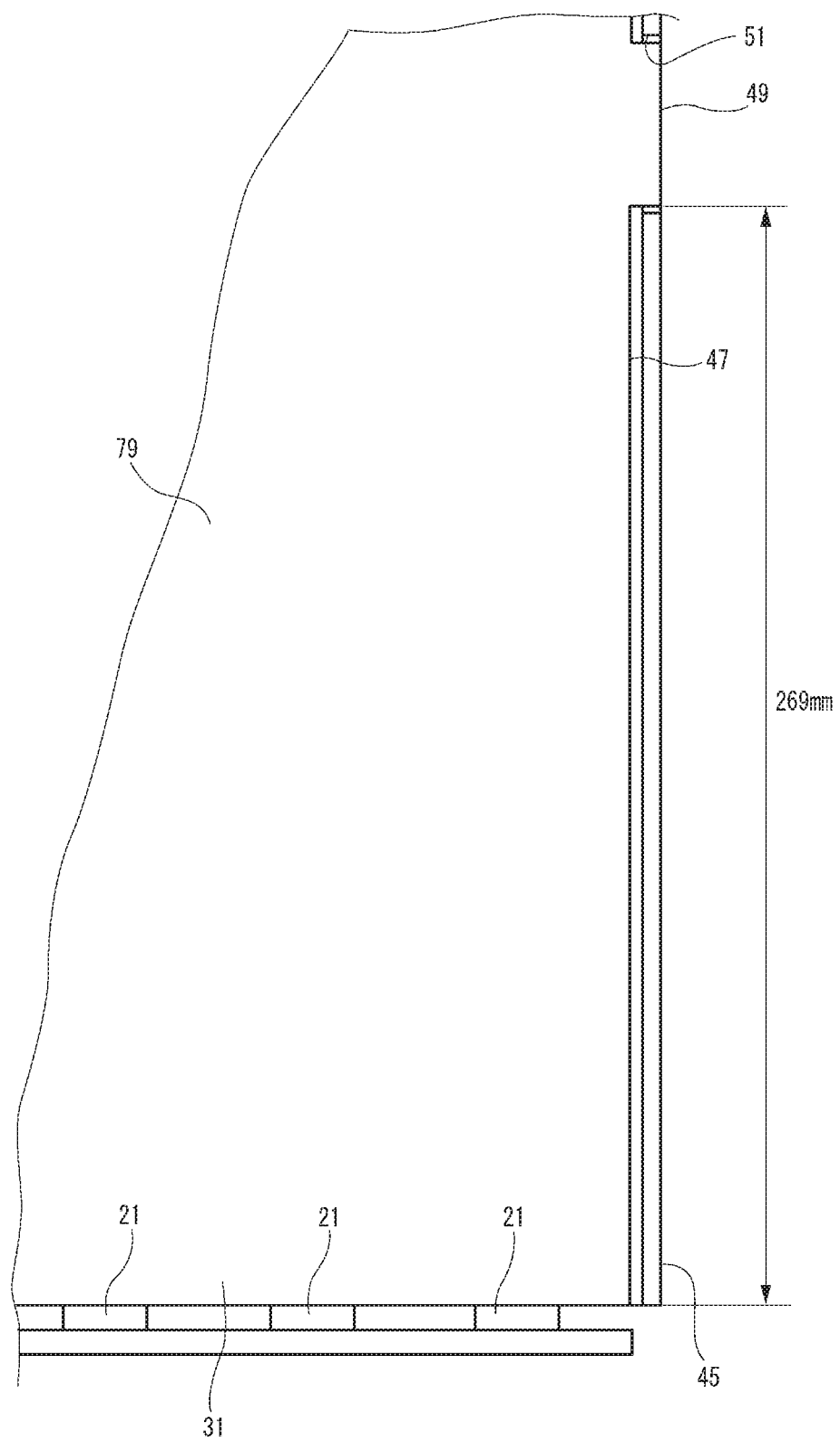
FIG. 12 is an operation illustrative view when the convex portion is relatively far from one end surface.

FIG. 12 is an operation illustrative view when the convex portion 49 is relatively far from the one end surface 31. A comparative example in which a position of the convex portion 49 is not in the vicinity of the one end surface 31 will be described.

In a light guiding plate 79 of the comparative example, the convex portion 49 is formed at a position of, for example, 269 mm from the one end surface 31. In the light guiding plate 79 according to the comparative example, when a temperature changes from 20° C. to 60° C. at a room temperature, the amount of change of the gap A becomes 0.5 mm or more. Therefore, the one end surface 31 of the light guiding plate 79 is in contact with the LEDs 21.

An amount of change due to a temperature change in the light guiding plate 15 shown in FIG. 11 and the light guiding plate 79 shown in FIG. 12 will be described.

Figure 13:
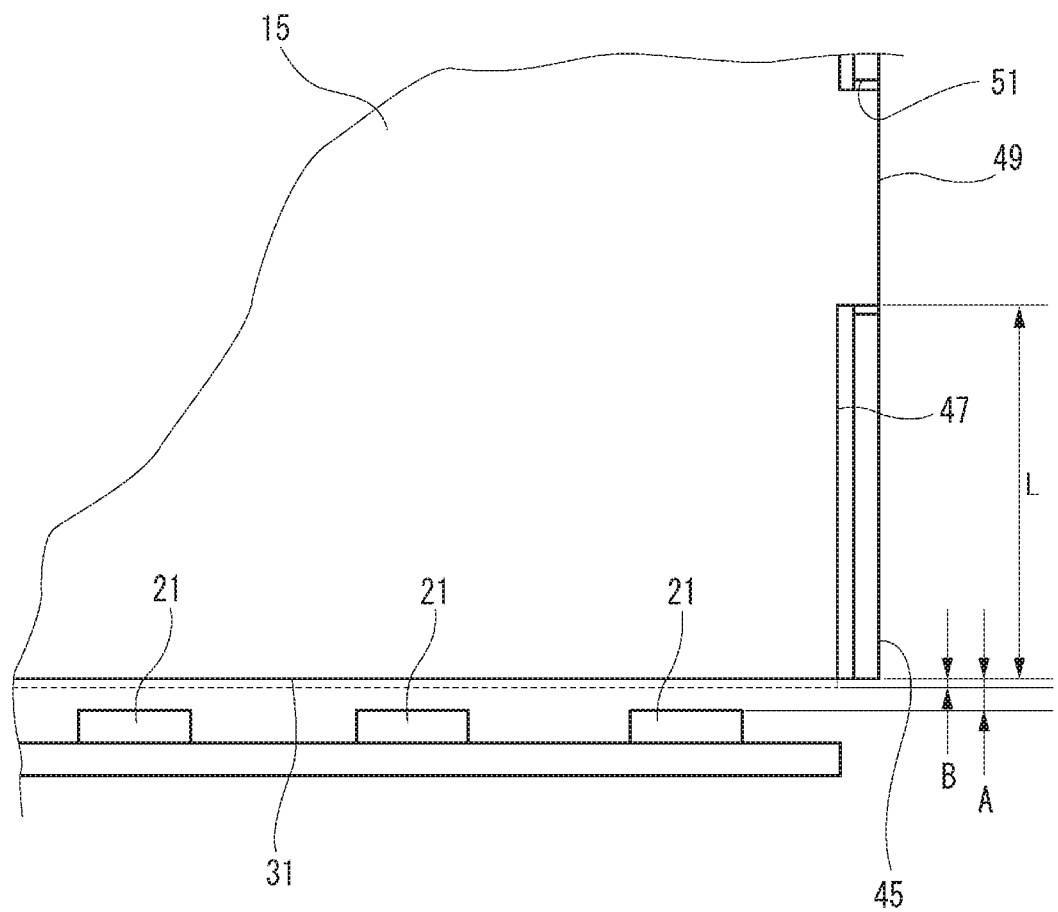
FIG. 13 is an operation illustrative view of one end surface that changes due to thermal expansion.

FIG. 13 is an operation illustrative view of the one end surface 31 that changes due to thermal expansion. In the figure, L is a distance from the one end surface 31 to the convex portion 49, A is a gap between the LED light emitting surface and the one end surface 31, and B is a dimensional change amount of an L value.

[Coefficient]

A linear expansion coefficient of the light guiding plate 15 (acrylic resin material) is $7 \times 10^{-5}/°C$.

A linear expansion coefficient of the back-side frame 37 (aluminum material) is $2.35 \times 10^{-5}/°C$.

[Calculation Formula 1]

An amount of change B of an L dimension when a temperature rises from 20° C. to 60° C. at a room temperature $$B = L \times (7-2.35)10^{-5} \times (60-20)$$

[Calculation Formula 2]

The gap A between the LED light emitting surface and the one end surface 31 (a gap dimension at a room temperature is 0.5 mm)

$$A = 0.5 - B$$

[Calculation Example]
When L=55

$$B = 55 \times (7-2.35)10^{-5} \times (60-20) = 0.1023 \text{ mm}$$

$$A = 0.5 - 0.1023 \approx 0.4 \text{ mm}$$

When L=269

$$B = 269 \times (7-2.35)10^{-5} \times (60-20) = 0.500 \text{ mm}$$

$$A = 0.5 - 0.5 = 0$$

Figure 14:
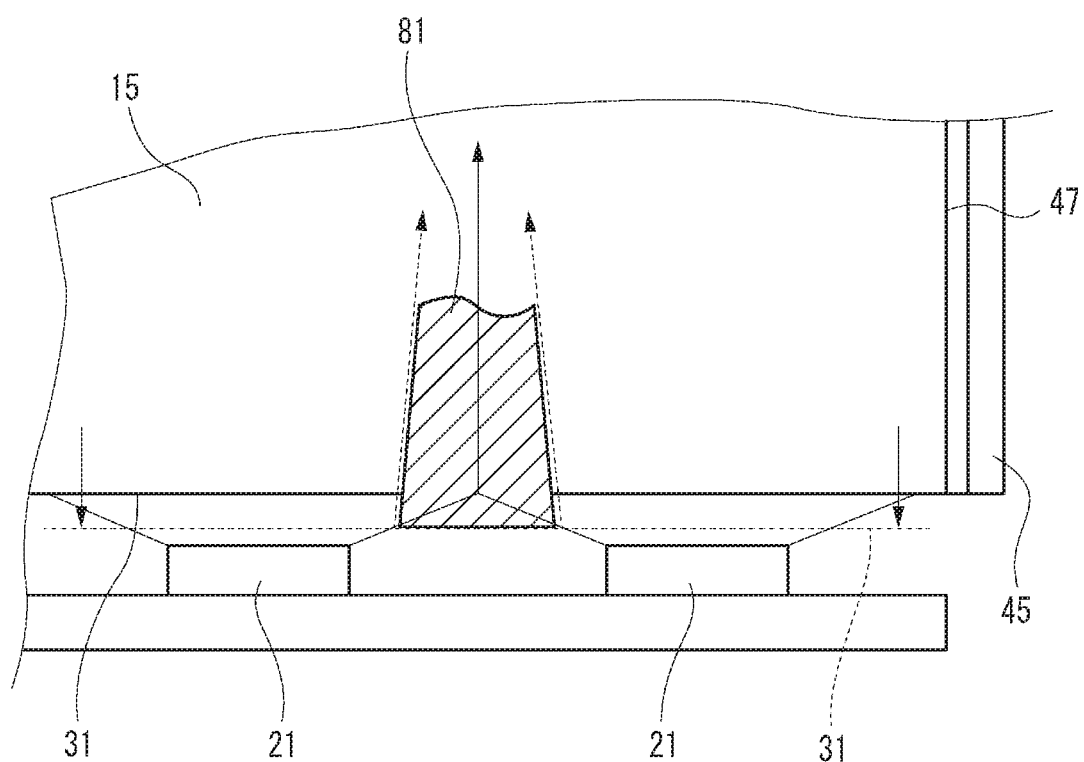
FIG. 14 is an operation illustrative view when one end surface is close to the LEDs.

FIG. 14 is an operation illustrative view when the one end surface 31 is close to the LEDs 21. Further, when the one end surface 31 of the light guiding plate 15 is close to the LEDs 21, a light non-incident region 81 where light from the LEDs 21 is not incident is generated. In this case, the light guiding plate 15 tends to cause unevenness in color and brightness on a surface facing the liquid crystal panel that emits light toward the liquid crystal panel 13.

Next, an operation of the liquid crystal display apparatus 11 according to the above-described first embodiment will be described.

The liquid crystal display apparatus 11 according to the first embodiment includes the quadrangular liquid crystal panel 13 having the reflection layer 23 on the back surface opposite to the display surface 29. The liquid crystal display apparatus 11 includes the light guiding plate 15 that is formed in the quadrangular shape substantially the same as that of the liquid crystal panel 13 and is laminated on the display surface 29, diffusely reflects light incident from the one end surface 31 and emits the light toward the display surface 29, and includes the pair of convex portions 49 that protrude outward from a vicinity of the one end surface 31 on the pair of parallel adjacent end surfaces 47 that sandwich the one end surface 31. The liquid crystal display apparatus 11 includes the frame 17 that has the LED holding plate 41 (an example of a light source holding plate) in which the plurality of LEDs 21 (an example of a light source) are mounted on the LED fixing plate 55, the plurality of LEDs 21 causing light to be incident on the one end surface 31, the LED fixing plate 55 being bent perpendicularly to the back-side frame 37 (an example of a back-side portion) and facing the one end surface 31, the back-side frame 37 being formed in the quadrangular shape substantially the same as that of the liquid crystal panel 13, in which the bent side plate portions 45 that face the pair of adjacent end surfaces 47 are respectively formed on the pair of adjacent side portions of the back-side frame 37 that sandwich the LED fixing plate 55, and in which the notches 51 into which the convex portions 49 are fitted are provided in the pair of bent side plate portions 45.

That is, in the light guiding plate 15 of the liquid crystal display apparatus 11, the convex portions 49 that protrude outward from the pair of adjacent end surfaces 47 are fitted into the notches 51 formed in the pair of bent side plate portions 45 of the back-side frame 37. The light guiding plate 15 and the frame 17 on which the LEDs 21 are mounted are positioned by a relative movement in a surface direction being restricted by the fitting of the convex portions 49 and the notches 51. The liquid crystal panel 13 is fixedly disposed on the light guiding plate 15. Accordingly, the light guiding plate 15 and the liquid crystal panel 13 can be positioned with simple components as compared with a related-art structure in which a plurality of frame-shaped members are used by stacking the frame-shaped members inside and outside.

Therefore, in the liquid crystal display apparatus 11 according to the first embodiment, positional deviation between the light source and the light guiding plate 15 for the front light can be prevented while achieving edge narrowing with simple components.

In the light guiding plate 15 and the back-side frame 37, the convex portions 49 provided on the light guiding plate 15 are respectively fitted into the notches 51 provided in the back-side frame 37. As a fitting structure, conversely, a fitting structure is also conceivable in which the convex portions 49 provided on the back-side frame 37 are respectively fitted into the notches 51 provided in the light guiding plate 15. In this case, since the notches 51 are provided in the light guiding plate 15, a defect occurs in waveguide of light. In order to obtain the same amount of light, the light guiding plate 15 has to be formed largely by that amount. On the contrary, in the configuration in which the convex portions 49 are provided on the light guiding plate 15, an outer shape of the light guiding plate 15 excluding the convex portions 49 can be made smaller than a case where the notches are provided, while obtaining the same amount of light. Accordingly, the light guiding plate 15 provided with the convex portions 49 can be made smaller, lighter, and reduced in a material cost as compared with the light guiding plate 15 provided with the notches.

Since the frame member 33, that holds a periphery of the light guiding plate 15 and the liquid crystal panel 13, does not have a positioning structure and positioning strength, the liquid crystal display apparatus 11 can be formed to be thin and have a narrow edge.

Further, the frame 17 includes the LED fixing plate 55 that is bent perpendicularly to the back-side frame 37 and faces the one end surface 31 of the light guiding plate 15. The LED fixing plate 55 is provided with the plurality of LEDs 21 along the one end surface 31 of the light guiding plate 15. The convex portions 49 and the notches 51 that position the light guiding plate 15 and the frame 17 are arranged in the vicinity of the one end surface 31 of the light guiding plate 15. The one end surface 31 of the light guiding plate 15 approaches (displaces) the LEDs 21 when the one end surface 31 is thermally expanded by driving of the LEDs 21 or the like. At this time, since a vicinity of the one end surface 31 of the light guiding plate 15 is fitted into and fixed to the notches 51 of the frame 17, an expansion amount between the one end surface 31 and the LEDs 21 is suppressed to be small.

An amount of change between the one end surface 31 and the LEDs 21 increases as a distance between the one end surface 31 and a convex portion 49 increases. In the liquid crystal display apparatus 11, since the convex portion 49 is disposed in the vicinity of the one end surface 31, the amount of change between the one end surface 31 and the LEDs 21 due to thermal expansion of the light guiding plate 15 is small. That is, in the liquid crystal display apparatus 11, it is possible to prevent positional deviation of both movement of the entire light guiding plate in the surface direction and displacement of the one end surface 31 with respect to the LEDs 21 due to the thermal expansion of the light guiding plate 15.

In the frame 17, the back-side frame 37 and the LED holding plate 41, which are separately formed, are integrally fixed by screws 53 (an example of a fastener).

In the liquid crystal display apparatus 11, the frame 17 includes two members: the back-side frame 37 and the LED holding plate 41. Since the back-side frame 37 and the LED holding plate 41 are separate bodies, workability of assembling the liquid crystal panel 13 and the light guiding plate 15 to the frame 17 is satisfactorily achieved as compared with a case where the frame 17 is integrated. That is, after the back-side frame 37, the liquid crystal panel 13 and the light guiding plate 15 are positioned and assembled, the LED holding plate 41 can be fixed to the back-side frame 37 by covering the relay substrate 27 and the like provided on the back-side frame 37.

The back-side frame 37 and the LED holding plate 41 are formed as separate bodies, so that the back-side frame 37 and the LED holding plate 41 can be formed of metal plates having different thicknesses.

The pair of positioning portions 67 each including the positioning hole 69 and the fastener insertion hole 71 are provided on the LED holding plate 41 so as to be separate from each other in a direction along the one end surface 31. The back-side frame 37 is provided with the pair of bulging portions 65 each including the boss 75 fitted into the positioning hole 69 and the female screw portion 77 with which a fastener is screwed on the tip end seating surface 73 that protrudes toward the LED holding plate 41 and has a flat surface.

In the liquid crystal display apparatus 11, the bulging portions 65 that protrude toward the LED holding plate 41 are provided on the back surface of the back-side frame 37. The boss 75 and the female screw portion 77 are formed on the tip end seating surface 73 of the bulging portion 65. The pair of bosses 75 are separately provided in the direction along the one end surface 31. Accordingly, the light guiding plate 15 can effectively prevent positional deviation in which the one end surface 31 that faces the LEDs 21 rotates about a rotation axis perpendicular to the light guiding plate 15 at a fixed position.

Since the boss 75 provided on the tip end seating surface 73 of the bulging portion 65 can be fitted into the positioning hole 69 of the LED holding plate 41 with high accuracy, positioning accuracy can be improved as compared with a positioning and fixing structure using only a fastener.

The bulging portion 65 can be formed on the back-side frame 37 by drawing. Therefore, it is possible to secure a screwing space at a tip end of a fastener and prevent the tip end of the fastener from interfering with the liquid crystal panel 13 without using a separate member. Further, between the back-side frame 37 and the LED holding plate 41, a gap that can house a component corresponding to a protruding height of the bulging portions 65 can be easily formed.

The light guiding plate 15 is closely fixed to the display surface 29 of the liquid crystal panel 13 via the adhesive layer 57.

In the liquid crystal display apparatus 11, the light guiding plate 15 and the liquid crystal panel 13 are closely fixed via the adhesive layer 57, so that an integrated structure having higher strength than that in a case where each of the light guiding plate 15 and the liquid crystal panel 13 is a single item can be formed. Further, the light guiding plate 15 can be brought into close contact with the display surface 29 of the liquid crystal panel 13 evenly by the adhesive layer 57, and an air gap can be prevented from being formed between the liquid crystal panel 13 and the light guiding plate 15. Accordingly, by using the adhesive layer 57 having a particularly low refractive index (a layer made of silicon or the like), double reflection can be prevented.

In the liquid crystal display apparatus 11, the back-side frame 37 and the liquid crystal panel 13 are not fixed to each other.

In the liquid crystal display apparatus 11, when the back-side frame 37 and the liquid crystal panel 13 are temporarily fixed and the liquid crystal panel 13 and the light guiding plate are thermally expanded, a reaction force received from the back-side frame 37 can be prevented from being applied to the fitting structure of the convex portions 49 and the notches 51. Accordingly, positional deviation between the one end surface 31 of the light guiding plate 15 and the LEDs 21 due to an excessive stress being applied to the fitting structure of the convex portions 49 and the notches 51 can be prevented.

In the liquid crystal display apparatus 11, the LED holding plate 41 is formed of a metal plate thicker than a plate thickness of the back-side frame 37.

In the liquid crystal display apparatus 11, only the LED holding plate 41 that supports an entire load of the liquid crystal display apparatus 11 can be made of a small and thick plate material, and the back-side frame 37 that mainly holds the light guiding plate 15 and the liquid crystal panel 13 can be made of a plate material thinner than the LED holding plate 41. Accordingly, a thickness of the back-side frame 37 can be reduced as compared with a case where the back-side frame 37 and the LED holding plate 41 are configured to have the same plate thickness, so that a weight of the apparatus can be reduced.

Further, by making the LED holding plate 41 thick, a thermal capacity can be increased as compared with a thin plate material. Accordingly, heat dissipation performance of the LEDs 21 can be improved by improving thermal conduction from the LEDs 21. As a result, a life of the LEDs 21 can be extended.

In the liquid crystal display apparatus 11, the component housing space 61 is provided between the back-side frame 37 and the LED holding plate 41.

In the liquid crystal display apparatus 11, it is possible to secure a thin and wide space over an entire area of an overlapping portion by only securing a relatively small gap in the overlapping portion between the back-side frame 37 and the LED holding plate 41. Accordingly, the overlapping portion between the back-side frame 37 and the LED holding plate 41 is effectively used, and it is possible to easily secure a space for housing a thin and relatively large-sized component such as a substrate while avoiding interference with other components.

Although the various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be naturally understood that they also belong to the technical scope of the present disclosure. Components in the various embodiments described above may be combined optionally in the range without deviating from the spirit of the invention.

This application is a continuation of PCT application No. PCT/JP2019/012242, which was filed on Mar. 22, 2019 based on Japanese Patent Application (No. 2018-086775) filed on Apr. 27, 2018, the contents of which are incorporated herein by reference.

The present disclosure is useful as a liquid crystal display apparatus that achieves edge narrowing with simple components and prevents positional deviation between a light source and a light guiding plate for a front light.

What is claimed is:

1. A liquid crystal display apparatus comprising:
a quadrangular liquid crystal panel having a reflection layer on a back surface opposite to a display surface of the liquid crystal panel;
a light guiding plate formed in a quadrangular shape substantially the same as that of the liquid crystal panel, being laminated on the display surface, configured to diffusely reflect light incident from one end surface of the light guiding plate and emits the light toward the display surface, and having a pair of convex portions that protrude outward from a pair of end surfaces that sandwich the one end surface; and
a frame having a light source holding plate in which a light source is mounted on a light source fixing plate, the light source causing light to be incident on the one end surface, the light source fixing plate being bent perpendicularly to a back-side portion and facing the one end surface, the back-side portion being formed in a quadrangular shape substantially the same as that of the liquid crystal panel,
wherein bent side plate portions, that face the pair of end surfaces, are respectively provided on a pair of side portions of the back-side portion that sandwich the light source fixing plate; and
wherein notches, into which the convex portions are fitted, are provided in the pair of bent side plate portions.

2. The liquid crystal display apparatus according to claim 1,
wherein the frame includes the back-side portion and the light source holding plate which are separately formed and which are integrally fixed by a fastener.

3. The liquid crystal display apparatus according to claim 2,
wherein the light source holding plate is provided with a pair of positioning portions, each of which includes a positioning hole and a fastener insertion hole, the pair of positioning portions being separately spaced in a direction along the one end surface; and
wherein the back-side portion is provided with a pair of bulging portions each having a boss fitted into the positioning hole and a female screw portion with which the fastener is screwed on a tip end seating surface that protrudes toward the light source holding plate and is a flat surface.

4. The liquid crystal display apparatus according to claim 1,
wherein the light guiding plate is closely fixed to the display surface of the liquid crystal panel through an adhesive layer.

5. The liquid crystal display apparatus according to claim 4,
wherein the liquid crystal panel is fixed to the light guiding plate; and
wherein the light guiding plate is fixed to the back-side portion.

6. The liquid crystal display apparatus according to claim 1,
wherein the light source holding plate is formed of a metal plate thicker than a plate thickness of the back-side portion.

7. The liquid crystal display apparatus according to claim 1,
wherein a component housing space is provided between the back-side portion and the light source holding plate.

* * * * *